United States Patent
Song

(10) Patent No.: US 10,560,383 B2
(45) Date of Patent: Feb. 11, 2020

(54) NETWORK LATENCY SCHEDULING

(71) Applicant: Futurewei Technologies, Inc., Plano, TX (US)

(72) Inventor: Haoyu Song, San Jose, CA (US)

(73) Assignee: Futurewei Technologies, Inc., Plano, TX (US)

(*) Notice: Subject to any disclaimer, the term of this patent is extended or adjusted under 35 U.S.C. 154(b) by 27 days.

(21) Appl. No.: 15/807,030

(22) Filed: Nov. 8, 2017

(65) Prior Publication Data

US 2018/0131614 A1   May 10, 2018

Related U.S. Application Data

(60) Provisional application No. 62/420,302, filed on Nov. 10, 2016.

(51) Int. Cl.
| | | |
|---|---|---|
| *H04L 12/28* | (2006.01) | |
| *H04L 12/801* | (2013.01) | |
| *H04L 12/26* | (2006.01) | |
| *H04L 12/841* | (2013.01) | |
| *H04L 12/863* | (2013.01) | |

(52) U.S. Cl.
CPC .......... *H04L 47/12* (2013.01); *H04L 43/0852* (2013.01); *H04L 47/283* (2013.01); *H04L 47/62* (2013.01)

(58) Field of Classification Search
None
See application file for complete search history.

(56) References Cited

U.S. PATENT DOCUMENTS

| | | | | |
|---|---|---|---|---|
| 6,775,280 | B1* | 8/2004 | Ma | H04L 45/00 370/230 |
| 7,466,655 | B1* | 12/2008 | Zhao | H04L 45/08 370/238 |
| 8,948,009 | B1* | 2/2015 | Hasan | H04L 47/193 370/231 |
| 9,231,887 | B2 | 1/2016 | Hamdi et al. | |
| 2002/0105921 | A1* | 8/2002 | Sawyer | H04L 43/00 370/328 |
| 2004/0213265 | A1 | 10/2004 | Oueslati et al. | |

(Continued)

FOREIGN PATENT DOCUMENTS

| | | | |
|---|---|---|---|
| CN | 1551580 | 12/2004 | |
| CN | 101873253 | 10/2010 | |
| EP | 1341350 A1 * | 9/2003 | ....... H04L 29/06027 |

OTHER PUBLICATIONS

"International Application No. PCT/CN2017/110184, International Search Report and Written Opinion dated Jan. 25, 2018", (dated Jan. 25, 2018), 11 pgs.

(Continued)

*Primary Examiner* — Elisabeth Benoit Magloire
(74) *Attorney, Agent, or Firm* — Schwegman Lundberg & Woessner, P.A.

(57) ABSTRACT

A router in a network receives a data packet to be transmitted to a receiver and obtains packet latency information identifying a time by which the packet is to be delivered to the receiver. The router then adds the packet to a push-in first-out (PIFO) queue in the router. The router pushes the packet into the PIFO queue as a function of the packet latency information and latency information of other packets in the PIFO queue.

24 Claims, 5 Drawing Sheets

(56) References Cited

U.S. PATENT DOCUMENTS

| | | | |
|---|---|---|---|
| 2009/0276542 A1* | 11/2009 | Aweya | H04J 3/0667 709/248 |
| 2012/0155265 A1* | 6/2012 | Ballani | H04L 47/826 370/235 |
| 2013/0258043 A1* | 10/2013 | Amano | H04N 7/15 348/14.08 |
| 2013/0304926 A1 | 11/2013 | Mital et al. | |
| 2015/0180784 A1* | 6/2015 | Tokutsu | H04L 12/4015 370/429 |
| 2016/0218979 A1* | 7/2016 | Roh | H04L 47/122 |
| 2018/0131625 A1* | 5/2018 | Kam | H04L 47/564 |
| 2019/0052565 A1* | 2/2019 | Modi | H04L 47/11 |

OTHER PUBLICATIONS

Sivaraman, Anirudh, et al., "Programmable Packet Scheduling at Line Rate", SIGCOMM '16, Aug. 22-26, 2016, Florianopolis, Brazil, (Aug. 22, 2016), 14 pgs.

* cited by examiner

NETWORK LATENCY SCHEDULING

CROSS REFERENCE TO RELATED APPLICATIONS

This application claims priority to U.S. Provisional Application No. 62/420,302 entitled "Network Latency Scheduling," filed Nov. 10, 2016, the contents of which are incorporated herein by reference.

TECHNICAL FIELD

The present disclosure is related to network latency scheduling, and in particular to providing network latency scheduling using push-in first-out queues in network routers.

BACKGROUND

The amount of data traffic on networks is rapidly increasing as services provided via networks keep evolving. For example, the increasing use of over-the-top video streaming services and on-line collaboration services has greatly increased traffic on both home and work networks. Certain network flows (e.g., interactive video, telepresence, virtual reality/augmented reality (VR/AR), and artificial intelligence (AI)) are more effective when they have low latency. Missed packet delivery deadlines may result in reduced user satisfaction with these services. Currently available QoS may not be able to meet these latency goals. Similarly, reserving bandwidth for these services may interfere with overall traffic on the network.

Currently it is difficult to realize network-wide low latency in a distributed network. Existing flow-control, rate control, and/or congestion control algorithms either have weak control on the overall latency or use complex protocols between hosts and routers. Reasons for the poor performance of existing algorithms include the amount of information used to guide router scheduling, and that routers may not be able to quickly and efficiently manipulate data in their queues.

SUMMARY

A method for operating a router in a network includes: receiving a packet at the router; obtaining packet latency information; identifying a target time by which the packet is to be delivered to a receiver; and adding the packet to a push-in first-out (PIFO) queue in the router in response to the packet latency information, wherein the packet is pushed into the PIFO queue as a function of the packet latency information and latency information of other packets in the PIFO queue.

Optionally, in the preceding aspect, the router is an access router and the method further includes: obtaining the packet latency information by determining the packet latency information based on an urgency of the packet and at least one measure of network condition; and adding the packet latency information to the packet.

Optionally, in any of the preceding aspects, the at least one measure of network condition includes a maximum latency value, and the determining of the packet latency information includes calculating the packet latency information for a non-urgent packet based on the maximum latency value.

Optionally, in any of the preceding aspects, the at least one measure of network condition includes a minimum latency value and the determining of the packet latency information includes calculating the packet latency information for an urgent packet based on the minimum latency value.

Optionally, in any of the preceding aspects, the method further includes sending the packet from the PIFO queue to a further device coupled to the network, wherein lowest-latency packets depart the PIFO queue prior to higher-latency packets.

Optionally, in any of the preceding aspects, the packet latency information includes a latency budget indicating an amount of time until the packet is to be delivered to the receiver, and the method further includes adjusting the packet latency information to reflect a holding time of the packet in the router before removing the packet from the PIFO queue.

Optionally, in any of the preceding aspects, the method further includes adjusting the packet latency information to reflect an expected transit time from the router to a next router or to the receiver.

Optionally, in any of the preceding aspects, the packet latency information includes a deadline indicating a time at which the packet is to be delivered to the receiver, and the method further includes removing packets from the PIFO queue using an earliest-deadline-first algorithm.

Optionally, in any of the preceding aspects, the router is a last router on a data path between a host at which the packet originated and the receiver, the method further including: calculating a plurality of actual latency values for a plurality of packets received from the host via the data path based on latency information of the respective packets; comparing the plurality of actual latency values to determine at least one measure of network congestion; and transmitting the at least one measure of network congestion to the host or to an access router coupled to the host.

Optionally, in any of the preceding aspects, the at least one measure of network congestion includes a maximum latency value of the plurality of actual latency values.

Optionally, in any of the preceding aspects, the at least one measure of network congestion includes a minimum latency value of the plurality of actual latency values.

Optionally, in any of the preceding aspects, the method further includes periodically transmitting the at least one measure of network congestion to the host or to the access router coupled to the host.

Optionally, in any of the preceding aspects, the method further includes: in response to the PIFO queue being full, comparing the obtained packet latency information to a latency value of a packet at a tail of the PIFO queue; and in response to the obtained packet latency information being less than the latency value of the packet at the tail of the PIFO queue, dropping the packet at the tail of the PIFO queue before adding the received packet to the PIFO queue.

Optionally, in any of the preceding aspects, the PIFO queue includes buckets of packets, each bucket including multiple packets having latency values in a respectively different range of latency values, and the adding of the packet to the PIFO queue includes adding the packet to one of the buckets having a range of latency values that includes the obtained packet latency information.

Optionally, in any of the preceding aspects, the method further includes: receiving a further packet having no latency information; inserting the further packet into a further queue, separate from the PIFO queue; and sending packets from the further queue in response to the PIFO queue being empty.

According to another aspect of the present disclosure, there is provided a method for operating a host server in a network, the method including: receiving network condition information for a path through the network from the host server to a receiver; generating a packet to be sent to the receiver; generating packet latency information for the packet based on the received network condition information; inserting the packet latency information into the packet; and forwarding the packet to a network router for forwarding to the receiver in accordance with the packet latency information.

Optionally, in any of the preceding aspects, the packet latency information includes a deadline, indicating a time at which the packet is to be delivered to the receiver.

Optionally, in any of the preceding aspects, the packet latency information includes a latency budget indicating an amount of time until the packet is to be delivered to the receiver.

Optionally, in any of the preceding aspects, the inserting of the packet latency information into the packet includes providing the packet latency information to an access router for insertion of the packet latency information into the packet by the access router.

According to yet another aspect of the present disclosure, there is provided an apparatus for a network router, the apparatus including: a push-in first-out (PIFO) queue; a memory storage including instructions; and one or more processors in communication with the PIFO queue and the memory storage, wherein the instructions configure the one or more processors to: receive a packet at the network router; obtain packet latency information for the packet; and add the packet to the PIFO queue in response to the packet latency information, wherein the packet is pushed into the PIFO queue as a function of the packet latency information and latency information of other packets in the PIFO queue.

Optionally, in any of the preceding aspects, the network router is an access router and the instructions further configure the one or more processors to: obtain the packet latency information by determining the packet latency information based on an urgency of the packet and at least one measure of network condition; and add the packet latency information to the packet.

Optionally, in any of the preceding aspects, the network router is a last router on a data path between a host at which the packet originated and a receiver, the instructions further configuring the one or more processors to: calculate a plurality of actual latency values for a plurality of packets received from the host via the data path; compare the plurality of actual latency values to determine at least a maximum latency value and a minimum latency value of the plurality of actual latency values; and transmit the maximum latency value and the minimum latency value to the host or to an access router coupled to the host.

According to another aspect of the present disclosure, there is provided a non-transitory computer-readable medium storing computer instructions for handling packets having latency information, the computer instructions, when executed by one or more processors of a network router, configuring the one or more processors to: receive a packet at the network router; obtain packet latency information identifying a target time by which the packet is to be delivered to a receiver; and add the packet to a push-in first-out (PIFO) queue in the network router in response to the packet latency information, wherein the packet is pushed into the PIFO queue as a function of the packet latency information and latency information of other packets in the PIFO queue.

Optionally, in any of the preceding aspects, the non-transitory computer-readable medium further includes instructions that, when executed, configure the one or more processors to: obtain the packet latency information by determining the packet latency information based on an urgency of the packet and at least one measure of network condition; and add the packet latency information to the packet.

Optionally, in any of the preceding aspects, the non-transitory computer-readable medium further includes instructions that, when executed, configure the one or more processors to: obtain the packet latency information by determining the packet latency information based on an urgency of the packet and at least one measure of network condition of a data path from a host to the receiver; and add the packet latency information to the packet.

Optionally, in any of the preceding aspects, the network router is a last router on a data path between a host and the receiver, and the non-transitory computer-readable medium further includes instructions that, when executed, configure the one or more processors to: calculate a plurality of actual latency values for a plurality of packets received from the host via the data path based on latency information of the respective packets; compare the plurality of actual latency values to determine at least a maximum latency value and a minimum latency value of the plurality of actual latency values; and transmit the maximum latency value and the minimum latency value to the host or to an access router coupled to the host.

A further method includes receiving network latency information at a host, generating a packet having latency information, inserting packet latency information into the packet in response to the latency information and the network latency information, and forwarding the packet to a network router for forwarding to a receiver in accordance with the packet latency information.

DETAILED DESCRIPTION

In the following description, reference is made to the accompanying drawings that form a part hereof, and in which are shown by way of illustration specific embodiments which may be practiced. These embodiments are described in sufficient detail to enable those skilled in the art to practice the subject matter described below, and it is to be understood that other embodiments may be utilized and that structural, logical, and electrical changes may be made consistent with the present description. The following description of example embodiments is, therefore, not to be taken in a limited sense, and the scope of the described subject matter is defined by the appended claims.

The functions or algorithms described herein may be implemented at least in part by software in some embodiments. The software may consist of computer-executable instructions stored on computer-readable media or on a computer-readable storage device such as one or more non-transitory memories or other type of hardware-based storage device, either local or networked. Further, such functions may correspond to modules, which may be implemented in software, hardware, firmware, or any combination thereof. Multiple functions may be performed in one or more modules as desired, and the embodiments described are merely examples. The software may be executed on a digital signal processor, programmable gate array (PGA), application-specific integrated circuit (ASIC), microprocessor, or other type of processing device operating in a computer system, such as a personal computer, server, or other computer system, turning such a computer system into a specifically programmed machine.

An efficient distributed latency control algorithm provides on-demand low latency to selected data flows in a network. As described below, the distributed algorithm may provide network-wide earliest-deadline-first (EDF) scheduling, lowest latency budget first scheduling, and/or target latency scheduling by labeling packets with their transmission deadlines, latency budgets, and/or target latencies and causing routers in the path from the source to the destination to schedule packets using the labels. Example embodiments take advantage of programmable data plane technology and efficient hardware-based push-in first-out (PIFO) queue implementation. While some embodiments are described in terms of labeling individual packets with latency information, it is contemplated that individual flows (e.g., an over-the-top (OTT) video stream) may be labeled with the latency information. These labels may be applied, for example, to each encapsulated packet in the stream.

Figure 1:
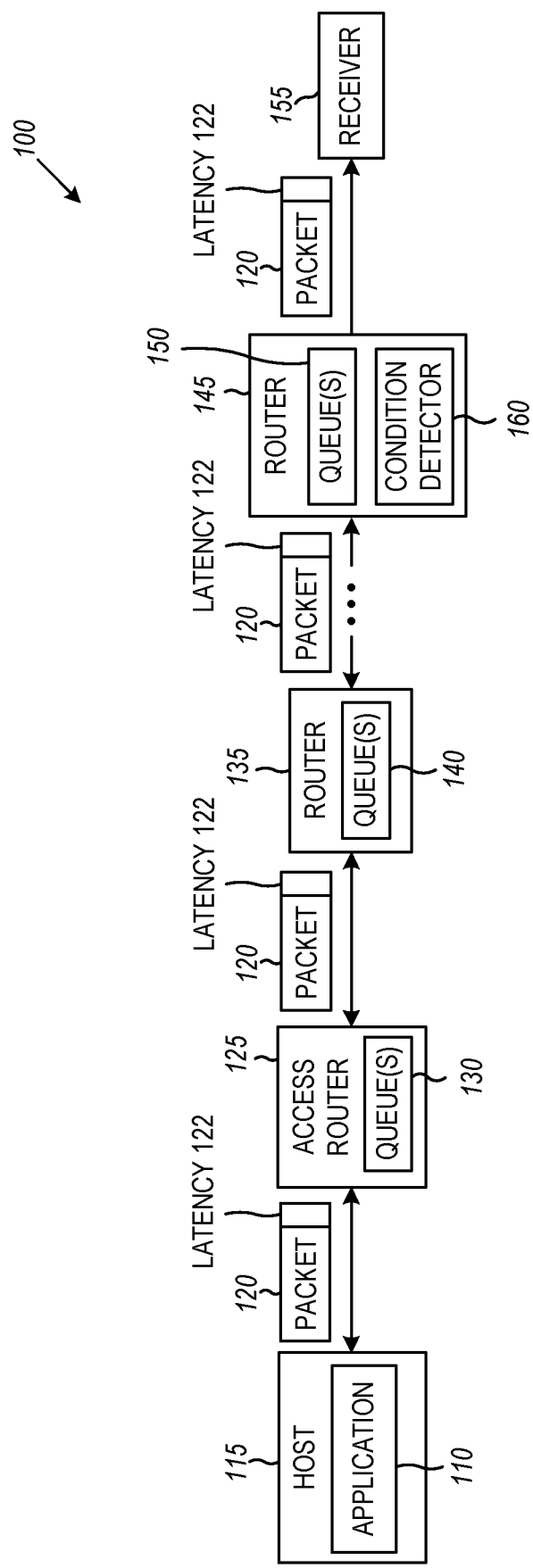
FIG. 1 is a block diagram illustrating a network utilizing a distributed latency scheduling system, according to an example embodiment.

FIG. 1 is a block diagram illustrating a portion of a network 100 utilizing distributed latency scheduling. As may be seen, a host 115 produces packets 120 that are routed through at least one router to arrive at a receiver 155. In the embodiment of FIG. 1, packet 120 is routed through an access router 125, one or more routers 135 and a final router 145 prior to be delivered to receiver 155. Here in FIG. 1, each of the routers 125, 135, and 145 includes one or more queues 130, 140, and 150, respectively, and the router 145 includes a condition determination block 160. Condition determination block 160 may be formed in hardware or discrete logic, in programmable logic (e.g., a field programmable gate array) or as an application or functional module created by an internal processor that executes computer instructions to generate the module.

In one embodiment, an application 110 executes on a host 115. The application 110 may be any type of application, such as an email application, process control application, video server, or other type of application that generates packets 120 and/or data streams to be sent to one or more destination devices, such as a receiver 155. The application 110 may be one that is generated by computer instructions executed by a processor such as, for example, processing unit 602 of FIG. 6 described below. If a plurality of applications exist on host 115, each application may be generated by one of a plurality of processors, e.g., processors of a device having a core with a plurality of processors, by individual devices, or by one processor executing a plurality of programs whose instructions create the applications.

The destination devices may be, without limitation, one or more consumers of OTT video streaming services, email clients, and/or web browsers. The packets 120 may be labeled with latency information 122, such as a deadline for delivery of the packet 120 or a latency budget. In some embodiments, the latency information 122 may be included as a field in the packet 120 header. Some packets 120 may be urgent, having times by which the packets 120 are to be delivered in order to ensure that the receiver 155 can display information, such as real-time video, in a timely manner. As used herein, an "urgent packet" is a packet that is to be delivered with a specified latency in order to ensure proper presentation of information. The specified latency may merely be, for example, a reduced amount of time (reduced in contrast to the amount of time allocated to non-urgent packets). Otherwise, if the data is display data (e.g., video) and the specified latency may be a target time at which the video data is to be displayed. If urgent packets are not delivered on time, the displayed video generated for a user at the receiver 155 may experience jitter or transitions that are not smooth thereby undesirably causing a negative experience.

In the example system shown in FIG. 1, the packets 120 are provided to a first router, referred to as an access router 125, which, in the example embodiment, includes one or more PIFO queues 130. In some embodiments, the access router 125 may receive the latency information 122 to be applied to the packets 120 from the application 110 via the host 115. In one embodiment, the host 115 may provide default latency information 122 for selected streams of related packets 120 or packets 120 of a certain type. The access router 125 may also determine latency information 122 based on network condition information provided from other nodes in the network 100 and label the packets 120 with this determined latency information 122. The packets 120 may then be placed into one or more of the PIFO queues 130 based on the latency information 122. In effect, the packet 120 is placed into the PIFO queue 130 based on a temporal priority such that it may hop through the network 100 through multiple routers, each having PIFO queues, and each of which inserts the packet 120 into one or more respective queues based on the latency information 122 such that packets 120 labeled for lower-latency transmission traverse the network 100 from the host 115 to the receiver 155 in less time than higher-latency packets.

In the embodiment shown, an intermediate router 135, coupled to receive the packets 120 from the access router 125, has a PIFO queue 140, and may be coupled directly or via multiple other intermediate routers to a last router 145, which also has a PIFO queue 150. Packets 120 received by the last router 145 are passed on to the receiver 155, where the packet 120 is delivered according to its labeled latency.

In addition to sending the packets 120 to the receiver 155, the last router 145 in the path from the host 115 to the receiver 155 may include a condition module 160 that determines the condition of the network 100 and reports the determined condition to the host 115 and/or access router 125. In one embodiment, the condition module 160 may compare a current time with the latency information 122 to generate a representation of network congestion. The determination can be based on whether the packet 120 arrived at the receiver 155 on time. The condition indicator may be a simple binary value (e.g., 1 for late or 0 for on time).

Alternatively, the network condition indicator may be expressed in more granular values. For example, maximum and minimum latency values for packets between the host 115 and router 145 may be determined from multiple received packets processed by the condition module 160 over time. The minimum latency may occur when there is little network traffic and unlabeled packets, having no latency information, are not significantly delayed in the router queues. The maximum latency may occur when the network traffic is high and the unlabeled packets experience significant queuing delays in the router(s). The maximum and minimum latency values may then be sent back to the host 115 and/or access router 125 for use in determining latency information to be applied to the packets processed by the host 115 and/or access router 125. For example, an urgent packet may be assigned the minimum latency value, while a non-urgent packet may be assigned the maximum latency value or may be sent without latency information. The condition module 160 may be hardware, software, programmed hardware, or a combination of hardware and software.

Although the network 100 is shown as including one host 115, one receiver 155, and a single path, including the routers 125, 135, and 145, between the host 115 and the receiver 155, it is contemplated that the network 100 may include multiple hosts and multiple access routers that connect to multiple receivers along multiple paths. Each of the multiple routers may be used in more than one path. Embodiments having multiple hosts and/or multiple receivers may include multiple condition modules, each condition module monitoring the condition of the network between a receiver and its respective serving host, based on the packet streams or flows transferred between the serving host and the receiver.

Figure 2A:
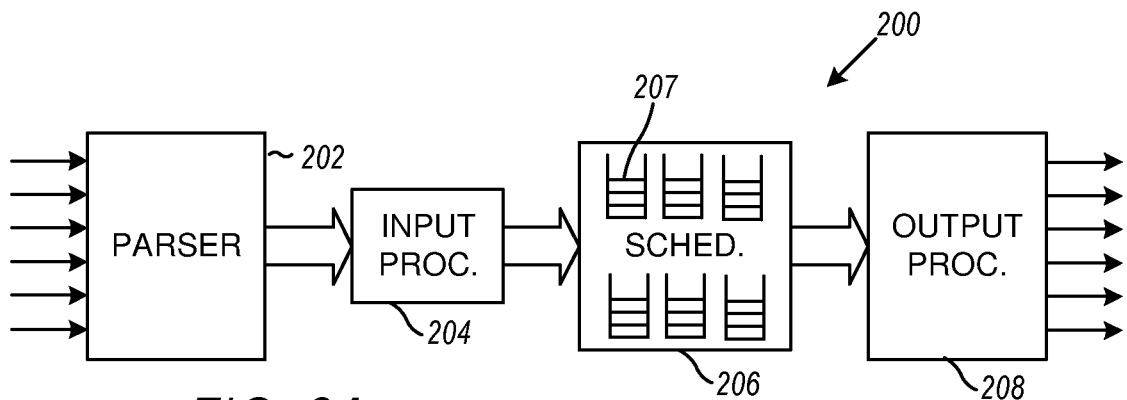
FIG. 2A is a block diagram illustrating an example programmable data plane including a push-in first-out (PIFO) queue.

FIG. 2A is a block diagram of an example programmable data plane employing PIFO queues that may be programmed to implement a router 200 suitable for use as any of the routers 125, 135, or 145 shown in FIG. 1. The router 200 may be implemented using Open Systems Interconnection (OSI) level 3 hardware such as the Tofino switch available from Barefoot Networks or the Trident II+ switch available from Broadcom. The example router 200 includes a parser 202, an input processor 204, a scheduler 206 including multiple PIFO queues 207, and an output processor 208. The parser 202 may, for example, extract the destination IP addresses from packets received by the router 200. These IP addresses may be translated to data link addresses by the input processor 204 using a routing table. The scheduler 206 routes the received packets to appropriate PIFO queues 207 based on the data link addresses. The output processor 208 may adjust the data rate of the packets based on the physical links between the router 200 and the destination address identified for each packet.

A push-in first-out (PIFO) queue is a queue in which a new packet can be inserted (pushed) into any location in the queue and in which the de-queueing process only happens at the queue head (first-out). A packet is inserted into the queue based on its rank so that all packets in the queue are in rank order. In embodiments described below, the rank is derived from the latency information. As described below, the latency information may include one or more of a desired time for the packet to be delivered to the receiver 155 (e.g., a deadline), a desired presentation time (e.g., for a packet of a video stream), the remaining latency of a desired latency inserted by the application 110 or host 115, the remaining latency of a maximum latency, the remaining latency of a latency budget, or other latency measure.

Figure 2B:
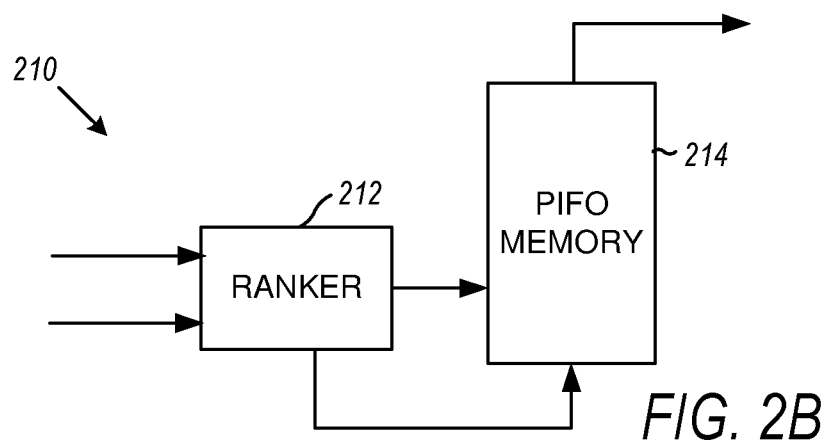
FIG. 2B is a block diagram showing an example implementation of a PIFO queue.

FIG. 2B is a block diagram showing an example implementation of a PIFO queue 210 including a ranker 212 and a PIFO memory 214. The ranker 212 extracts the latency information from the packet, derives rank information from the latency information, and provides the packet, its latency information, and its rank to the PIFO memory 214 in parallel. The PIFO memory 214 inserts the packet provided by the ranker 212 into the PIFO memory 214 at a location determined by its rank such that more urgent packets are placed closer to the head of the queue than less urgent packets. As described below, the latency information in the packet may be adjusted based on an amount of time that the packet is held in the router and, optionally, on an expected routing time to the next router and/or to the receiver. An example implementation of PIFO queues is described in a paper by A. Sivaraman et al. entitled "Programmable Packet Scheduling at Line Rate", *SIGCOMM* '16, pp 44-57, 2016, the contents of which are incorporated herein by reference.

Figure 3:
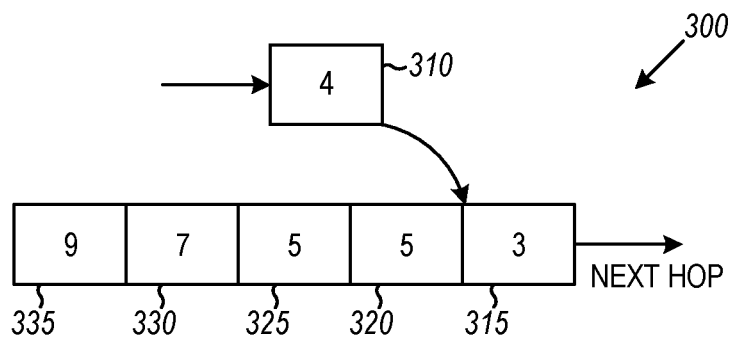
FIG. 3 is a block diagram of a PIFO queue illustrating the receipt of a packet to be pushed or inserted into the PIFO queue.

FIG. 3 is a block diagram of a PIFO queue 300, illustrating the receipt of a packet 310 to be pushed or inserted into the PIFO queue 300. For simplicity of explanation, the packet 310 is shown with a latency information label of "4". The latency of "4" is a simplified latency, which may, as described above, be a time or other representation of a deadline by which, or latency budget with which, the packet 310 should be delivered to the receiver. The PIFO queue 300, prior to having the packet 310 inserted, has five packets with varying latency information labels. A head of the PIFO queue 300, from which packets depart for their next hop to another router or the receiver, is indicated at 315, and the packet at the head of the PIFO queue 300 has a latency label of "3". In this example, the latency information label may represent a remaining latency budget, for example, a remaining time interval until the packet is to be delivered to the receiver or presented by the receiver. The lower the latency information, the sooner the packet should depart from the PIFO queue 300. The other four packets are represented at 320, 325, 330, and 335 with respective latency information labels of "5", "5", "7", and "9". The packet 335 having the latency information label "9" is at the end of the PIFO queue 300, and, thus, is the last packet to depart the PIFO queue 300 for the next hop to a subsequent router or to the destination receiver. In this example PIFO queue 300, the packet 310, with latency information label "4", is pushed or inserted into the PIFO queue 300 after the packet 315 with the latency information label "3" and before the packet 320 with the latency information label of "5". The push operates by shifting the packets 320, 325, 330, and 335 to the left by one packet so that the packet 310 may be inserted in the memory location currently occupied by the packet 320.

In one embodiment, the PIFO queue 300 is a hardware-based PIFO queue with de-queueing at the head of the queue. The packet latency information may be a deadline in some embodiments, such that the PIFO queue 300 implements an earliest-deadline-first algorithm for de-queueing. In a further embodiment, the packet latency information may include a maximum network delay allowed from a sender of the packet to a receiver of the packet. In still other embodiments, the packet latency information may include a target latency. When the latency information represents a maximum latency, a target latency, or a latency budget, the latency information value may be reduced at each router; for example, each router may adjust the latency information to reflect a packet holding time and/or an expected transport time to the next router/receiver.

If the PIFO queue 300 is full when the new packet 310 is inserted, the tail packet 335 may be dropped from the end or tail of the PIFO queue 300 prior to pushing the packet 310 into the second location in the PIFO queue 300. For protocols having guaranteed delivery, such as Transmission Control Protocol (TCP) packets, the dropped packet may not be received at the receiver and may be retransmitted. For protocols without guaranteed delivery, such as User Datagram Protocol (UDP), the packet may be lost and the receiver may compensate for the lost packet using error concealment functionality.

Alternatively, rather than dropping a packet, the PIFO queue 300 may hold the packet 310 until the packet at the head of the PIFO queue 300 is sent to the next router and shift the remaining packets in the PIFO queue 300 appropriately to insert the held packet at the appropriate location.

In one embodiment, the packet latency information is a target deadline by which the packet is to be delivered to the receiver. In this instance, the packets in the PIFO queue 300 are arranged based on the differences between their respective latency information labels and a current time.

Although FIG. 3 shows individual packets being stored in the PIFO queue 300 by their rank, as described below, the packet latency information values may be grouped with respect to a fixed number of buckets. As described below, the use of buckets may reduce the ranking overhead for the PIFO queues.

Referring to FIG. 1, each router 125 and 135 may subtract a time that a packet is held by the router from the latency budget of the packet, or otherwise adjust the latency information 122 prior to sending the packet 120 to a next router. The router may also adjust the latency information to reflect an expected transport time between the router and the next router.

In still further embodiments, packets without latency information may be placed in a separate queue (not shown). Packets may be sent from these separate queues in response to the queue having packets with latency information being empty. If a packet 120 is received at a network router (not shown) that does not handle packet latency information, the latency information 122 may be removed prior to the router 125 or 135 forwarding the packet 120. Alternatively, the latency information 122 may be left in the packet 120 to be handled by a subsequent router that does handle latency information.

When the latency information 122 includes a desired delivery or display time, the performance of the network 100 may be improved by synchronizing all of the nodes of the network 100 (e.g., the host 115, the routers 125, 135, and 145, and the receiver 155) to a common time of day (TOD) clock. In some embodiments, a clock synchronization protocol such as IEEE 1588, or a common time reference (e.g., a global navigation satellite system (GNSS) time reference) may be used to synchronize all of the nodes of the network 100 to a common time reference. In these networks, the packets may be arranged in the various PIFO queues 130, 140, and 150 in time order, the packets having a time value closer to the current time being closer to the head of the PIFO queue. When the packet latency information does not include a time value (for example, when it includes a latency budget), the various network nodes may not be synchronized to a common TOD clock.

When the latency information is a latency budget (e.g., the remainder of a desired latency or a maximum latency), the packets having the smaller latency value may be closer to the queue head.

A latency information 122 value including a label for a deadline can be added by the host 115 or by the access router 125. In either case, the receiver 155 may enter into a service agreement (e.g., for a particular quality of service (QoS), authentication protocol, billing, etc.) with the host 115 or the application 110 running on the host 115, before the service begins. The service agreement may, for example, provide for charges based on the urgency of the packets being sent. The access router 125 may verify the agreement for a particular flow and notify the host 115 of the network condition (e.g., maximum, minimum, and current latency).

The network 100 may continuously measure its condition or measure its condition according to a predetermined schedule using one or more condition modules 160. When operating under a service agreement, a host 115 may apply the maximum target latency as the latency information 122 to packets 120 without delivery deadlines. Under the agreement, packets assigned the maximum latency may not incur additional network charges. When there is no known maximum latency, a rule-of-thumb latency, a default maximum latency, or a preset value (e.g., all 1s or all 0s) may be applied as the latency information 122.

Each router 125, 135, and 145 ranks the packets 120 based on the latency information 122 of each packet and inserts the packets 120 into the respective PIFO queue 130, 140, and 150 to realize earliest-deadline-first (EDF) scheduling. If there is no space in a queue (i.e., the queue is already full), the packet 120 to be added may be dropped (e.g., if it has latency information 122 that is larger than the largest latency information value in the queue). Alternatively, when the packet 120 has latency information 122 that is less than the largest latency information value in the queue, the tail packet may be dropped and the packet 120 may be inserted into a space in the queue that is made by shifting the packets having larger latency information values farther down in the queue. Thus, even in a congested network, an urgent packet 120 may be delivered with latency close to the minimum because the urgent packet 120 is moved to the head of each of the PIFO queues 130, 140, and 150 in each of the routers 125, 135, and 145 along its path.

Even if its deadline is already passed, an urgent packet 120 can be delivered with minimum latency, for example by setting its latency information 122 to the current time or to the current time plus the minimum latency determined by the condition module 160. Alternatively, the latency budget for the urgent packet 120 may be set to zero or to the minimum latency value.

To reduce the ranking workload for the PIFO queues 130, 140, and 150, the queues may group the packets 120 according to their latency information 122 into a fixed number of buckets. An example PIFO queue may include a number of buckets, each bucket containing packets having a respectively different range of latency values. A new packet may be inserted at the end of the bucket that includes its latency information value. Packets in the bucket corresponding to the lowest latency information value are extracted from the queue first followed by packets in the other buckets. These packets, however, may not be in strict order of latency information, as the packets in each bucket may not be sorted according to their latencies. Bucket scheduling results in a coarse-grained but potentially faster implementation. The queue size, the number of buckets, and the bucket size are design parameters that may be determined for a particular network and/or particular applications.

As described above, global network synchronization may be avoided by using a target latency budget as the latency information 122. In these embodiments, the routers 125 and 135 may use the latency information 122 values to insert packets into the respective PIFO queues 130 and 140, but before sending a packet to the router 135 or 145, the routers 125 and 135 may reduce the budget by the packet holding time in the router 125 or 135 (e.g., the time difference between when the packet arrived at the router and the current time) and optionally, by the expected transit time for the hop to the next router 135 or 145, respectively. Thus, the latency information 122 can roughly reflect how urgently the packet needs to be delivered to its destination.

Some embodiments only label the urgent flows with latency information, such that these flows are put into the PIFO queues 130, 140, and 150 with high priority. In these embodiments, the unlabeled flows may be placed at the ends of the queues or put into a low-priority queue and scheduled using other algorithms.

Many of these alternative embodiments are orthogonal with each other in that they can be used together or individually.

Figure 4:
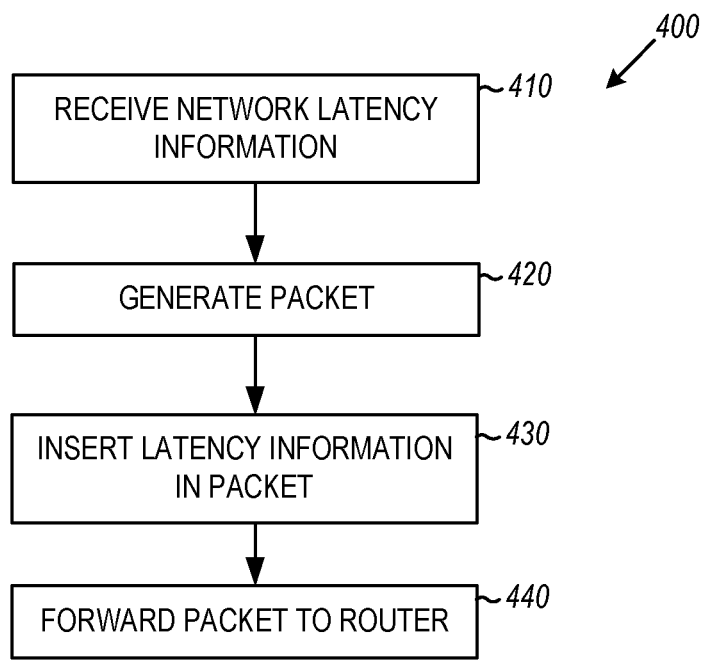
FIG. 4 is a flowchart illustrating a method of generating a packet having latency information for forwarding to a receiver via a network that includes multiple routers, according to an example embodiment.

FIG. 4 is a flowchart illustrating a method 400 of generating a packet having latency information for forwarding to a receiver via a network that includes multiple routers, according to an example embodiment. With reference to FIG. 1, block 410 of FIG. 4 receives network latency information representative of the condition of the network (e.g., maximum and minimum latency for each path between the host 115 and each receiver 155 served by the host 115). This network latency information may be used to determine desired latency information 122 for each packet 120. A packet 120 may be generated at block 420 by one or more applications 110 on the host 115. As described above, the desired latency for a packet 120 may be based on the network latency information or may be determined independently of the network latency information. Block 430 inserts the latency information 122 into the packet 120. As described above, the latency information 122 may be inserted in a header or elsewhere in the packet 120 according to a network protocol. Block 440 forwards the packet 120 to an access router 125. In some embodiments, the access router 125 may be provided with information from the host 115 and/or the condition module 160 and may generate and insert the latency information 122 into the packet 120 before adding the packet 120 to the PIFO queue 130 and forwarding it to the next router 135.

Figure 5:
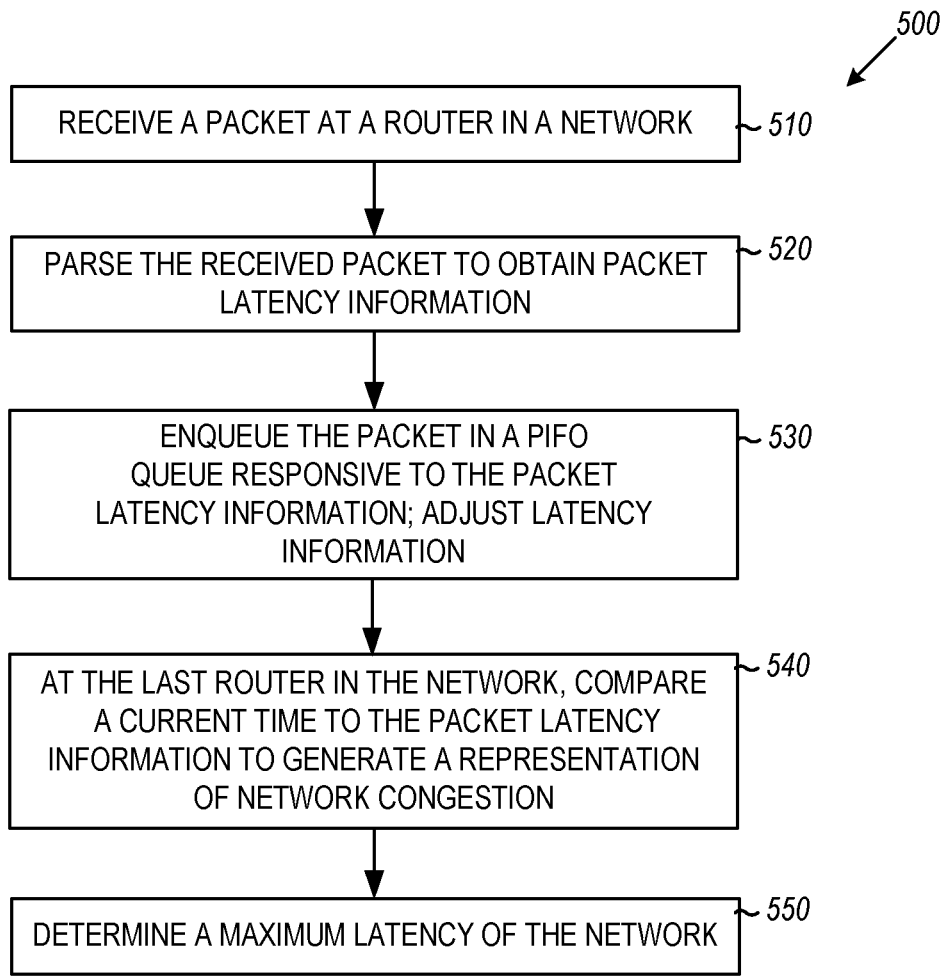
FIG. 5 is a flowchart illustrating a computer-implemented method of packet scheduling by inserting packets into a router queue based on packet latency information, according to an example embodiment.

FIG. 5 is a flowchart illustrating a computer-implemented method 500 of packet scheduling by inserting packets into a router queue based on packet latency information, according to an example embodiment. The method 500 includes receiving at block 510 a packet 120 at a router 135 in a network 100. The received packet 120 has latency information 122 indicating a desired latency. Block 520 parses the packet 120 to obtain the latency information 122 and other information, for example the destination IP address (not shown) of the packet 120. Block 530 adjusts the latency information 122 in the packet 120 to reflect the actual or expected holding time in the queue and, optionally, the expected transit time to the next router or to the receiver, and inserts (pushes) the packet 120 into the PIFO queue 140. The packet 120 is inserted as a function of the latency information 122 and the latency information values of other packets in the PIFO queue 140 such that lowest-latency packets depart the PIFO queue 140 before the higher-latency packets.

In some embodiments, the method 500 may include determining a network condition (e.g., a representation of network congestion), for example, at the last router 145, prior to sending a packet to the receiver 155. At block 540, the condition module 160 of the router 145 may use the latency information 122 from multiple packets 120 to generate the network condition information. For example, when the latency information 122 includes a target deadline, the deadline may be compared to a current time to generate a measure of network congestion. Alternatively, when the latency information 122 is a latency budget, the budget value itself may describe the network congestion. These packets, for example, may be used to determine a current minimum latency for an urgent packet.

In another embodiment, the condition module 160 may use unlabeled packets or packets that were labeled with a maximum latency value to determine maximum, minimum, and current transit times through the network 100 to generate respective measures of network congestion. To generate these measurements, it may be desirable for the latency information 122 to include a time at which the packet 120 left the host 115 or a marker indicating the urgency of the packet 120 in addition to the other latency information 122.

At block 550, the condition module 160 may send the maximum latency of the network observed to date, the minimum latency observed to date, and the current latency to the host 115 and/or access router 125 that provided the packet 120 so that the host 115 and/or access router 125 can determine the current level of network congestion and the parameters to be used to assign latency information 122 to packets 120 destined for the receiver 155.

In further embodiments, the condition module 160 may determine whether and/or how often the latencies of the received packets 120 were satisfied. This information may also be provided to the host 115 and/or access router 125 in various embodiments. As described above, the host 115 may use the maximum latency measurement to generate the latency information 122 of non-urgent packets 120, may use the minimum latency measurement to generate the latency information 122 of urgent packets 120, and may use both the minimum and maximum latency measurements to generate latency information 122 for less urgent packets 120.

Figure 6:
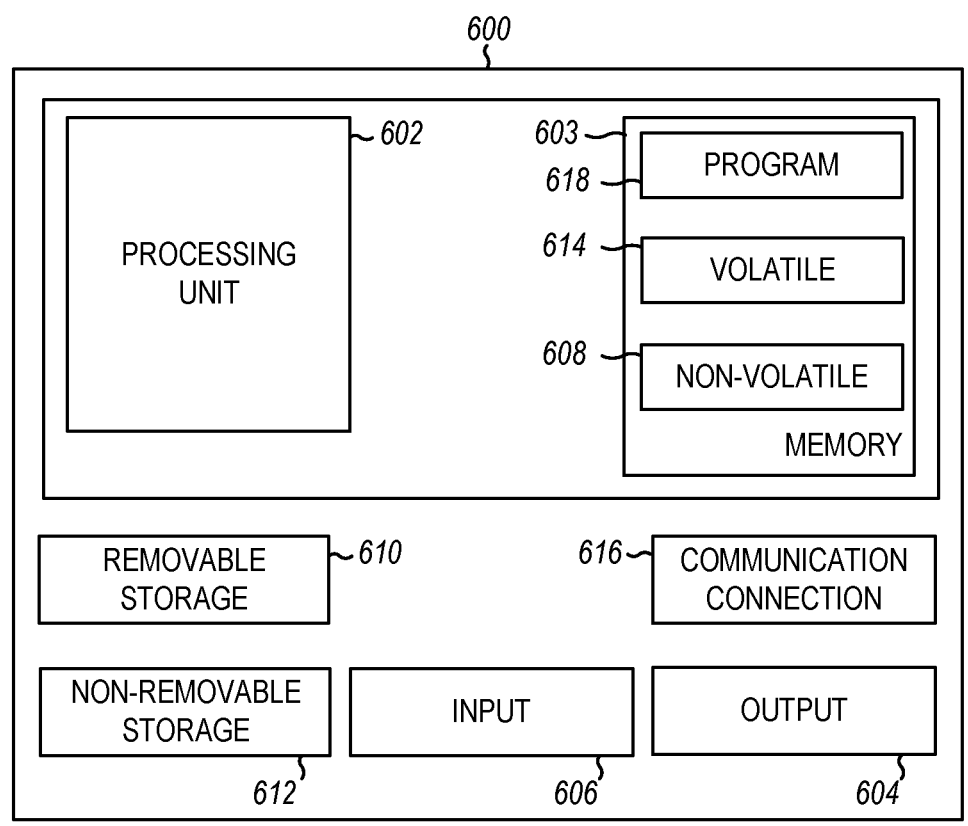
FIG. 6 is a block diagram illustrating circuitry for implementing computing systems for example embodiments.

FIG. 6 is a block diagram illustrating circuitry for implementing computing systems for example embodiments. These systems include the host 115, the routers 125, 135, 145, the receiver 155, and other systems for performing methods according to example embodiments. All components need not be used in various embodiments.

One example computing device in the form of a computer 600 may include a processing unit 602, memory 603, removable storage 610, and non-removable storage 612. Although the example computing device is illustrated and described as a computer 600, the computing device may be in different forms in different embodiments. For example, the computing device may instead be a server, a programmable data plane, a smartphone, a tablet, a smartwatch, or another computing device including elements the same as or similar to those illustrated and described with regard to FIG. 6. Devices such as smartphones, tablets, and smartwatches are generally collectively referred to as "mobile devices" or "user equipment". Further, although the various data storage elements are illustrated as part of the computer 600, the storage may also or alternatively include cloud-based storage accessible via a network, such as the Internet, or server-based storage.

The memory 603 may include volatile memory 614 and non-volatile memory 608. The computer 600 may include— or have access to a computing environment that includes—a variety of computer-readable media, such as the volatile memory 614 and non-volatile memory 608, removable storage 610, and non-removable storage 612. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

The computer 600 may include or have access to a computing environment that includes input 606, output 604, and a communication connection 616. When the computer 600 is a programmable data plane, the input 606 and output 604 may include the respective input and output ports of the router. The output 604 may also include a display device, such as a touchscreen, that also may serve as an input device. The input 606 may include one or more of a touchscreen, a touchpad, a mouse, a keyboard, a camera, one or more device-specific buttons, one or more sensors integrated within or coupled via wired or wireless data connections to the computer 600, and other input devices. The computer 600 may operate in a networked environment using the communication connection 616 to connect to one or more remote computers, such as database servers. The remote computer may include a personal computer (PC), a server, a router, a network PC, a peer device or other common network node, or the like. The communication connection 616 may include a Local Area Network (LAN), a Wide Area Network (WAN), cellular, Wi-Fi, Bluetooth, or other networks.

Computer-readable instructions stored on a computer-readable medium are executable by the processing unit 602 of the computer 600. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. For example, one or more application programs 618 may be used to cause processing unit 602 to perform one or more methods or algorithms described herein.

Although a few embodiments have been described in detail above, other modifications are possible. For example, the logic flows depicted in the figures do not require the particular order shown, or sequential order, to achieve desirable results. Other steps may be provided in, or steps may be eliminated from, the described flows, and other components may be added to, or removed from, the described systems. Other embodiments may be within the scope of the following claims.

What is claimed is:

1. A method performed by a router in a network, the method comprising:
   receiving a packet at the router;
   obtaining packet latency information including a packet latency budget indicating a target amount of time until the packet is to be delivered to a receiver;
   adding the packet to a push-in first-out (PIFO) queue in the router in response to the packet latency information, wherein the packet is pushed into the PIFO queue as a function of the packet latency information and latency information of other packets in the PIFO queue; and
   reducing the packet latency budget by a holding time of the packet in the router before removing the packet from the PIFO queue.

2. The method of claim 1, wherein the router is an access router and the method further includes:
   obtaining the packet latency information by determining the packet latency information based on an urgency of the packet and at least one measure of network condition; and
   adding the packet latency information to the packet.

3. The method of claim 2, wherein the at least one measure of network condition includes a maximum latency value and the determining of the packet latency information includes calculating the packet latency information for a non-urgent packet based on the maximum latency value.

4. The method of claim 2, wherein the at least one measure of network condition includes a minimum latency value and the determining of the packet latency information includes calculating the packet latency information for an urgent packet based on the minimum latency value.

5. The method of claim 1, further comprising sending the packet from the PIFO queue to a further device coupled to the network, wherein packets having lowest-latency information depart the PIFO queue prior to packets having higher latency information.

6. The method of claim 1, further comprising reducing the packet latency budget by an expected transit time from the router to a next router or to the receiver.

7. The method of claim 1, wherein the packet latency information comprises a deadline indicating a time at which the packet is to be delivered to the receiver, and wherein the method further comprises removing packets from the PIFO queue using an earliest-deadline-first algorithm.

8. The method of claim 1, wherein the router is a last router on a data path between a host at which the packet originated and the receiver, the method further comprising:
   calculating a plurality of actual latency values for a plurality of packets received from the host via the data path based on latency information of the respective packets;
   comparing the plurality of actual latency values to determine at least one measure of network congestion; and
   transmitting the at least one measure of network congestion to the host or to an access router coupled to the host.

9. The method of claim 8, wherein the at least one measure of network congestion includes a maximum latency value of the plurality of actual latency values.

10. The method of claim 8, wherein the at least one measure of network congestion includes a minimum latency value of the plurality of actual latency values.

11. The method of claim 8, further comprising periodically transmitting the at least one measure of network congestion to the host or to the access router coupled to the host.

12. The method of claim 1 further comprising:
   in response to the PIFO queue being full, comparing the obtained packet latency information to a latency value of a packet at a tail of the PIFO queue; and
   in response to the obtained packet latency information being less than the latency value of the packet at the tail of the PIFO queue, dropping the packet at the tail of the PIFO queue before adding the received packet to the PIFO queue.

13. The method of claim 1, wherein:
   the PIFO queue includes multiple buckets each bucket holding packets having latency budgets in a respectively different range of latency budgets; and
   the adding of the packet to the PIFO queue includes adding the packet to one of the buckets having a range of latency budgets that includes the packet latency budget included in the obtained packet latency information.

14. The method of claim 1 further comprising:
receiving a further packet having no latency information;
inserting the further packet into a further queue, separate from the PIFO queue; and
sending packets from the further queue in response to the PIFO queue being empty.

15. A method for operating a host server in a network, the method comprising:
receiving network condition information for a path through the network from the host server to a receiver;
generating a packet to be sent to the receiver;
generating packet latency information for the packet based on the received network condition information;
forwarding the packet to an access router for forwarding to the receiver in accordance with the packet latency information; and
providing the packet latency information to the access router for insertion of the packet latency information into the packet by the access router.

16. The method of claim 15, wherein the packet latency information comprises a deadline, indicating a time at which the packet is to be delivered to the receiver.

17. The method of claim 15, wherein the packet latency information comprises a latency budget indicating an amount of time until the packet is to be delivered to the receiver.

18. An apparatus for a network router, the apparatus comprising:
a push-in first-out (PIFO) queue;
a memory storage comprising instructions; and
one or more processors in communication with the PIFO queue and the memory storage, wherein the instructions configure the one or more processors to:
receive a packet at the network router;
obtain packet latency information for the packet the packet latency information including a latency budget indicating a target amount of time until the packet is to be delivered to a receiver;
add the packet to the PIFO queue in response to the packet latency information, wherein the packet is pushed into the PIFO queue as a function of the packet latency information and latency information of other packets in the PIFO queue; and
reduce the packet latency budget by a holding time of the packet in the router before removing the packet from the PIFO queue.

19. The apparatus of claim 18, wherein the network router is an access router and the instructions further configure the one or more processors to:
obtain the packet latency information by determining the packet latency information based on an urgency of the packet and at least one measure of network condition; and
add the packet latency information to the packet.

20. The apparatus of claim 18, wherein the network router is a last router on a data path between a host at which the packet originated and a receiver, the instructions further configuring the one or more processors to:
calculate a plurality of actual latency values for a plurality of packets received from the host via the data path;
compare the plurality of actual latency values to determine at least a maximum latency value and a minimum latency value of the plurality of actual latency values; and
transmit the maximum latency value and the minimum latency value to the host or to an access router coupled to the host.

21. A non-transitory computer-readable medium storing computer instructions for handling packets having latency information, the computer instructions, when executed by one or more processors of a network router, configuring the one or more processors to:
receive a packet at the network router;
obtain packet latency information including a latency budget indicating a target amount of time until the packet is to be delivered to a receiver;
add the packet to a push-in first-out (PIFO) queue in the network router in response to the packet latency information wherein the packet is pushed into the PIFO queue as a function of the packet latency information and latency information of other packets in the PIFO queue; and
reduce the packet latency budget by a holding time of the packet in the router before removing the packet from the PIFO queue.

22. The non-transitory computer-readable medium of claim 21 further comprising computer instructions that, when executed, configure the one or more processors to:
obtain the packet latency information by determining the packet latency information based on an urgency of the packet and at least one measure of network condition; and
add the packet latency information to the packet.

23. The non-transitory computer-readable medium of claim 21, wherein the network router is an access router coupled to a host and the non-transitory computer-readable medium further comprises computer instructions that, when executed, configure the one or more processors to:
obtain the packet latency information by determining the packet latency information based on an urgency of the packet and at least one measure of network condition of a data path from the host to the receiver; and
add the packet latency information to the packet.

24. The non-transitory computer-readable medium of claim 21, wherein the network router is a last router on a data path between a host and the receiver, and the non-transitory computer-readable medium further comprises computer instructions that, when executed, configure the one or more processors to:
calculate a plurality of actual latency values for a plurality of packets received from the host via the data path based on latency information of the respective packets;
compare the plurality of actual latency values to determine at least a maximum latency value and a minimum latency value of the plurality of actual latency values; and
transmit the maximum latency value and the minimum latency value to the host or to an access router coupled to the host.

* * * * *